United States Patent
Breton et al.

(10) Patent No.: US 8,177,310 B2
(45) Date of Patent: May 15, 2012

(54) ELASTOMERIC TRACK FIELD-REPAIR ASSEMBLY

(75) Inventors: Rémi Breton, Drummondville (CA); Robert Bessette, St-Charles-de-Drummond (CA)

(73) Assignee: Soucy International Inc., Drummondville (CA)

( * ) Notice: Subject to any disclaimer, the term of this patent is extended or adjusted under 35 U.S.C. 154(b) by 235 days.

(21) Appl. No.: 12/515,690

(22) PCT Filed: Nov. 13, 2007

(86) PCT No.: PCT/CA2007/002038
§ 371 (c)(1),
(2), (4) Date: Jun. 11, 2009

(87) PCT Pub. No.: WO2008/061339
PCT Pub. Date: May 29, 2008

(65) Prior Publication Data
US 2010/0050427 A1     Mar. 4, 2010

(30) Foreign Application Priority Data

Nov. 20, 2006 (CA) ..................... 2568464

(51) Int. Cl.
*B62D 55/205* (2006.01)
(52) U.S. Cl. ....... 305/157; 305/165; 305/60; 29/402.01; 29/402.09
(58) Field of Classification Search .......... 305/157–158, 305/165, 182, 186, 60; 29/402.01, 402.09, 29/402.14, 402.15; 474/256
See application file for complete search history.

(56) References Cited

U.S. PATENT DOCUMENTS

| 3,799,627 | A | 3/1974 | Zwieg |
| 6,315,070 | B1 | 11/2001 | Carroll et al. |
| 6,517,173 | B1 * | 2/2003 | Oberlander et al. .......... 305/180 |
| 6,530,626 | B1 | 3/2003 | Benoit et al. |
| 7,625,050 | B2 * | 12/2009 | Bair .............................. 305/169 |

FOREIGN PATENT DOCUMENTS

| JP | 5116653 | 5/1993 |
| JP | 2000128037 | 5/2000 |

OTHER PUBLICATIONS

International Search Report of PCT.
Written Opinion of PCT.

* cited by examiner

*Primary Examiner* — Jason Bellinger
(74) *Attorney, Agent, or Firm* — Brouillette & Partners; Robert Brouillette; François Cartier (57) ABSTRACT

The field-repair assembly is used for temporarily repairing a ruptured or otherwise damaged elastomeric track mounted on a vehicle and generally allows the vehicle to proceed, preferably on its own, to a maintenance site located nearby where replacement or permanent repair of the track can be undertaken. The assembly comprises a plurality of spaced-apart and generally parallel support members, each of which being generally transversely disposed on the ground engaging outer surface of the track. The transverse members are secured to each side of the track via retention brackets. The transverse members are further linked together via flexible cables which are fixedly mounted to retention brackets. The assembly further comprises a bridging element generally mounted to a subset of the transverse members. The bridging element is generally located over the damaged area of the track and on the outer surface thereof for providing continuity and support to the damaged track.

13 Claims, 10 Drawing Sheets

SECTION A-A

FIG. 10

ELASTOMERIC TRACK FIELD-REPAIR ASSEMBLY

CROSS-REFERENCE TO RELATED APPLICATIONS

The present patent application claims the benefits of priority of commonly assigned Canadian Patent Application No. 2,568,464, filed at the Canadian Intellectual Property Office on Nov. 20, 2006.

FIELD OF THE INVENTION

The present invention generally relates to devices and assemblies used for temporarily repairing a damaged track in order for the vehicle to proceed, generally on its own, to the nearest maintenance site. The present invention more particularly but not exclusively relates to devices and assemblies used for temporarily repairing elastomeric tracks.

BACKGROUND OF THE INVENTION

Many modern tanks and other military vehicles, as well as some heavy utility vehicles (e.g. bulldozers, excavators, forestry equipments and/or other vehicles weighing generally more than 10,000 kg), are supported on the ground by a pair of tracks generally made of strong composite and preferably elastomeric materials. These tracks are also generally provided as endless bands even though tracks made of one or more segments are also used. Elastomeric tracks have many advantages over their conventional metallic counterparts. For instance, they are less noisy, they generate less vibration and they require less maintenance since they are not an assembly of a plurality of parts. Moreover, due to their elastomeric nature, elastomeric tracks are less likely to cause damages to roads or other structures on which they can travel.

However, elastomeric track can rupture or be otherwise damaged due to a defect in the material, wear and/or fatigue. A track may also be damaged by an object on which it travels. For instance, in the case of a military vehicle, a track may be damaged by a mine, a nearby explosion or a projectile. In all these instances, if the track is actually damaged, the affected vehicle is likely to be useless unless a repair is done in the field.

However, replacing a damaged track, directly in the field, with a new one is not always possible, especially if the damage occurred in hostile territory or in a location which is difficult to access. Furthermore, since some of the vehicles onto which elastomeric tracks are used may weight over sixty tons, replacing a track on such vehicles may require the presence of heavy lifting equipments. However, in certain circumstances, it may be difficult or even impossible to dispatch such heavy lifting equipments to the location of the affected vehicle.

There is thus a need to have a field-repair assembly for temporarily but suitably repairing a ruptured or otherwise damaged elastomeric track without generally interfering with the driving system of the track so that the vehicle can proceed, preferably on its own, to the nearest maintenance site where replacement or permanent repair of the track can be undertaken.

OBJECTS OF THE INVENTION

Accordingly, an object of the present invention is to provide a field-repair assembly for elastomeric track which can temporarily repair a damaged track and therefore allow the vehicle to proceed, preferably on its own, to a maintenance site.

Another object of the present invention is to provide a field-repair assembly for elastomeric track which can be relatively easily mounted to the damaged area of the track and which preferably does not hinder or interfere with the driving system of the track.

Yet another object of the present invention is to provide a field-repair assembly for elastomeric track which generally does not further damage or weaken the track.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

SUMMARY OF THE INVENTION

Accordingly, the present invention generally provides a field-repair assembly for use on damaged elastomeric track in order to allow the vehicle to be able to proceed, preferably on its own, to a maintenance site located nearby for a more complete repair or replacement of the track.

The field-repair assembly of the present invention is therefore adapted to be assembled and mounted to the outer ground engaging surface of the track and preferably over the damaged area thereof.

Once assembled and mounted to the track, the assembly will generally be strong enough provide additional support to the damaged area of the track in order to prevent the damage to worsen and to allow the vehicle to proceed to a maintenance site preferably without external assistance. Furthermore, depending upon the severity of the damage, the assembly can possibly act as a connecting bridge to fill in missing portions of the track and, optionally, to reconnect the track.

Thus, the field-repair assembly of the present invention generally comprises a plurality of transverse members adapted to be disposed on the outer ground engaging surface of the track. Each of these transverse members is further secured to the track via a pair of preferably L-shaped retention brackets which are adapted to engage the sides of the track and the inner surface thereof.

In order to connect the transverse support members and to provide a certain longitudinal continuity, each series of brackets located on each side of the track are further connected together via flexible means such as flexible cables. Preferably, but not exclusively, the cables are metallic in nature and should be strong enough to sustain the longitudinal strain which are likely to be applied to the track when the vehicle is in use. Yet, the cables should preferably be flexible enough to bend or flex around the sprocket or idler wheel of the vehicle when the damaged area is engaged thereby.

According to an aspect of the invention, the field-repair assembly is further provided with a bridging element which is adapted to be mounted to a subset of the transverse members. Preferably, the bridging element is generally mounted to the members located near and/or above the damaged area of the track. The bridging element generally prevents the damaged area of the track to further split open, particularly when the damaged area is engaged by the sprocket or the idler wheel of the vehicle. The bridging element therefore provides continuity and support to the damaged track and, in certain circumstances, provides a certain protection to the damaged area. Moreover, depending on the damage and if necessary, more than one bridging element could be mounted to a single field-repair assembly.

According to the invention, the bridging element is preferably pliable and/or resilient in order for the element to be able to bend and therefore follow the curvature of the sprocket or idler wheel when the damaged area of the track is engaged thereby. The pliability of the bridging element generally reduces the hindrance of the assembly with respect to the driving system of the track.

According to another aspect of the present invention, the retention brackets, which engage the inner surface of the track for providing support to the members, are generally not interfering with the driving system (e.g. sprocket wheel) of the track. Hence, a damaged track equipped with a field-repair assembly according to the invention will generally function as a normal track.

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

A novel field-repair assembly for an elastomeric track will be described hereinafter. Although the invention is described in terms of a specific illustrative embodiment, it is to be understood that the embodiment described herein is by way of example only and that the scope of the invention is not intended to be limited thereby.

Figure 5:
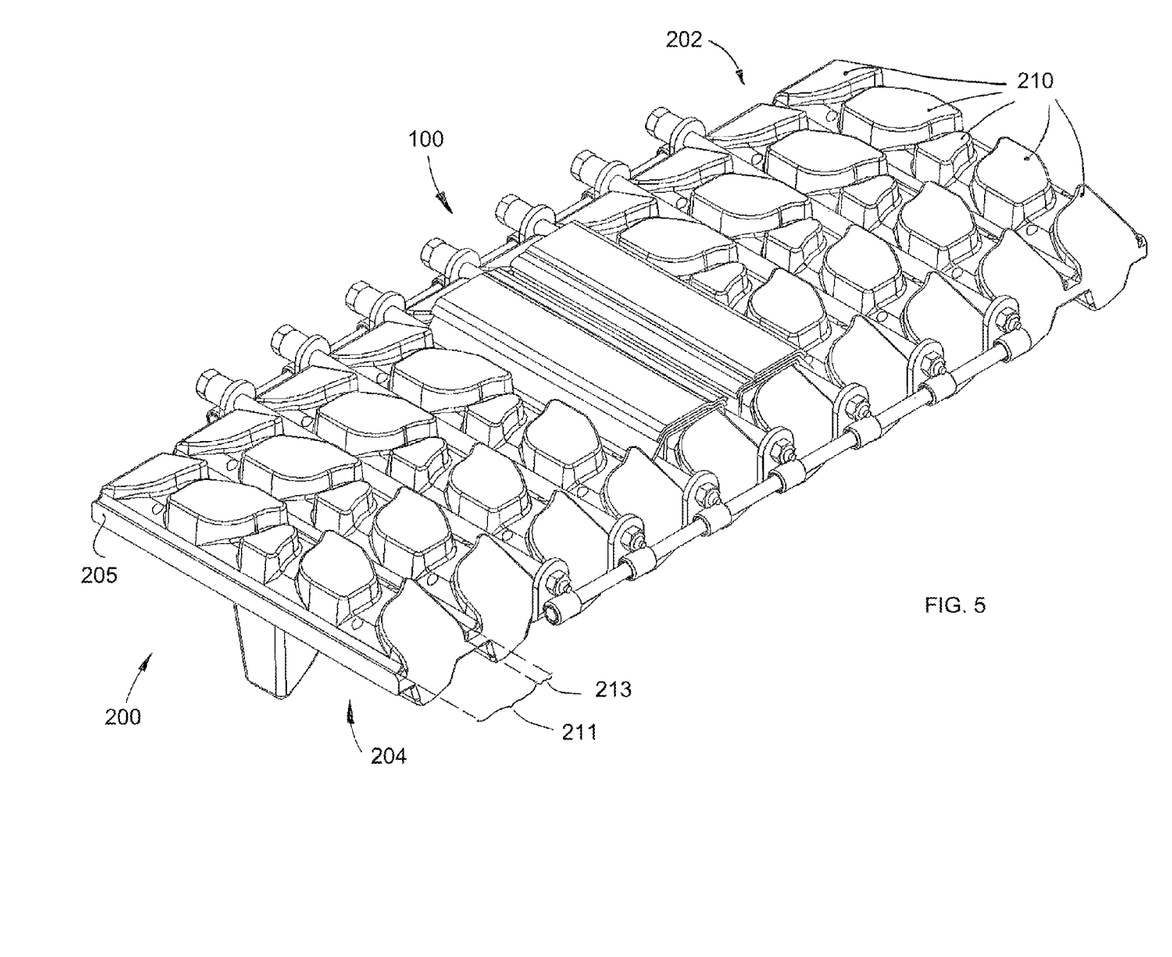
FIG. 5 is a perspective view of the outer surface of a portion of an elastomeric track with the field-repair assembly of FIG. 1 mounted thereon.
Figure 6:
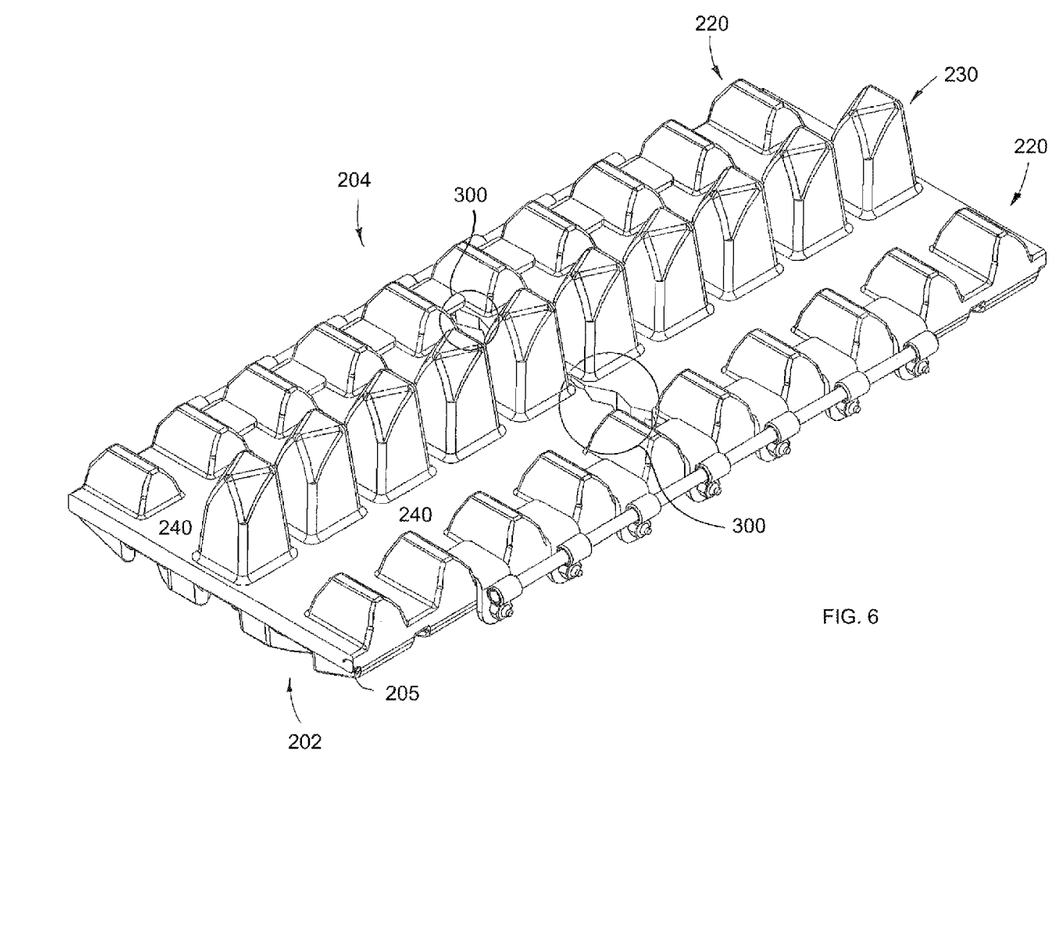
FIG. 6 is a perspective view of the inner surface of a portion of an elastomeric track with the field-repair assembly of FIG. 1 mounted thereon.

As generally shown in FIGS. 5 and 6, the field-repair assembly 100 of the present invention is generally adapted to be mounted onto an elastomeric track 200 and over a damaged area 300 thereof. The assembly 100 therefore provides a temporary repair to the track 200 which allows the vehicle equipped therewith to proceed to a maintenance site, preferably located nearby, for a more permanent repair of the track 200 or ultimately, for a complete replacement thereof.

As used hereinabove and hereinafter, the term "elastomeric" relates to any generally elastic and primarily non metallic materials such as natural and/or synthetic rubber, elastomers, composites, or other polymers and/or combinations thereof used in the manufacture of tracks.

The type of track 200 onto which the preferred embodiment of the assembly 100 is preferably mounted is shown in the figures. Yet, it is to be understood that the field-repair assembly 100 of the present invention can vary in shape and configuration according to the type and the configuration of the track onto which it is designed to be mounted. The preferred embodiment about to be described must therefore not be construed to be limitative in nature.

As shown in FIGS. 5 and 6, the track 200 generally comprises a main track body 205 defining an outer ground engaging surface 202 and an inner wheel engaging surface 204.

As best shown in FIG. 5, the outer surface 202 of the track 200 generally comprises a plurality of traction lugs 210 disposed thereon. Understandably, the exact shape and pattern of the traction lugs 210 can vary according to the terrain upon which the vehicle is ridden. Preferably, the tractions lugs 210 are laterally aligned in traction lug areas 211 and consecutive lug areas 211 are generally separated by lug-less hinge areas 213. The hinge areas 213 generally allow the track 200 to bend around the sprocket and idler wheels (not shown) when engaged thereby.

Now referring to FIG. 6, the inner surface 204 of the track 200 generally comprises at least one and preferably two rows of longitudinally aligned drive lugs 220. Preferably, the drive lugs 220 are located near or adjacent to the sides of the track 200. Still, other configurations are also possible. The inner surface 204 of the track 200 can also be provided with longitudinally aligned guide lugs or horns 230 (hereinafter "guide lugs"). The guide lugs 230 are generally used to guide the track over the sprocket, road and idler wheels of the vehicle (not shown) and hence, to prevent detracking. Accordingly, the guide lugs 230 are generally neither adapted nor used to drive the track 200.

In order to provide space for the passage of the wheels of the vehicle, the rows of guide lugs 230 and drive lugs 220 are preferably laterally spaced apart in order define wheel paths 240 therebetween.

Figure 1:
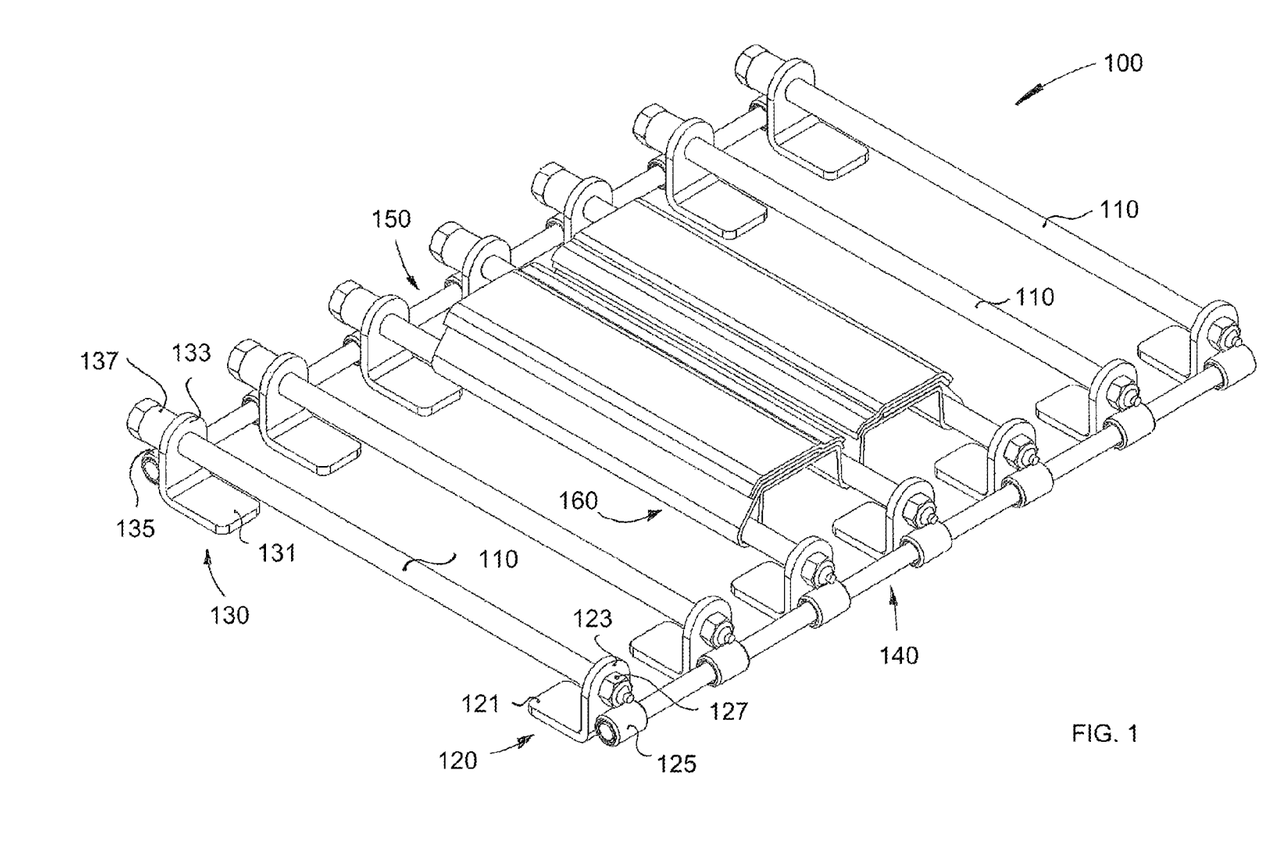
FIG. 1 is a perspective view of an embodiment of the field-repair assembly of the present invention.
Figure 2:
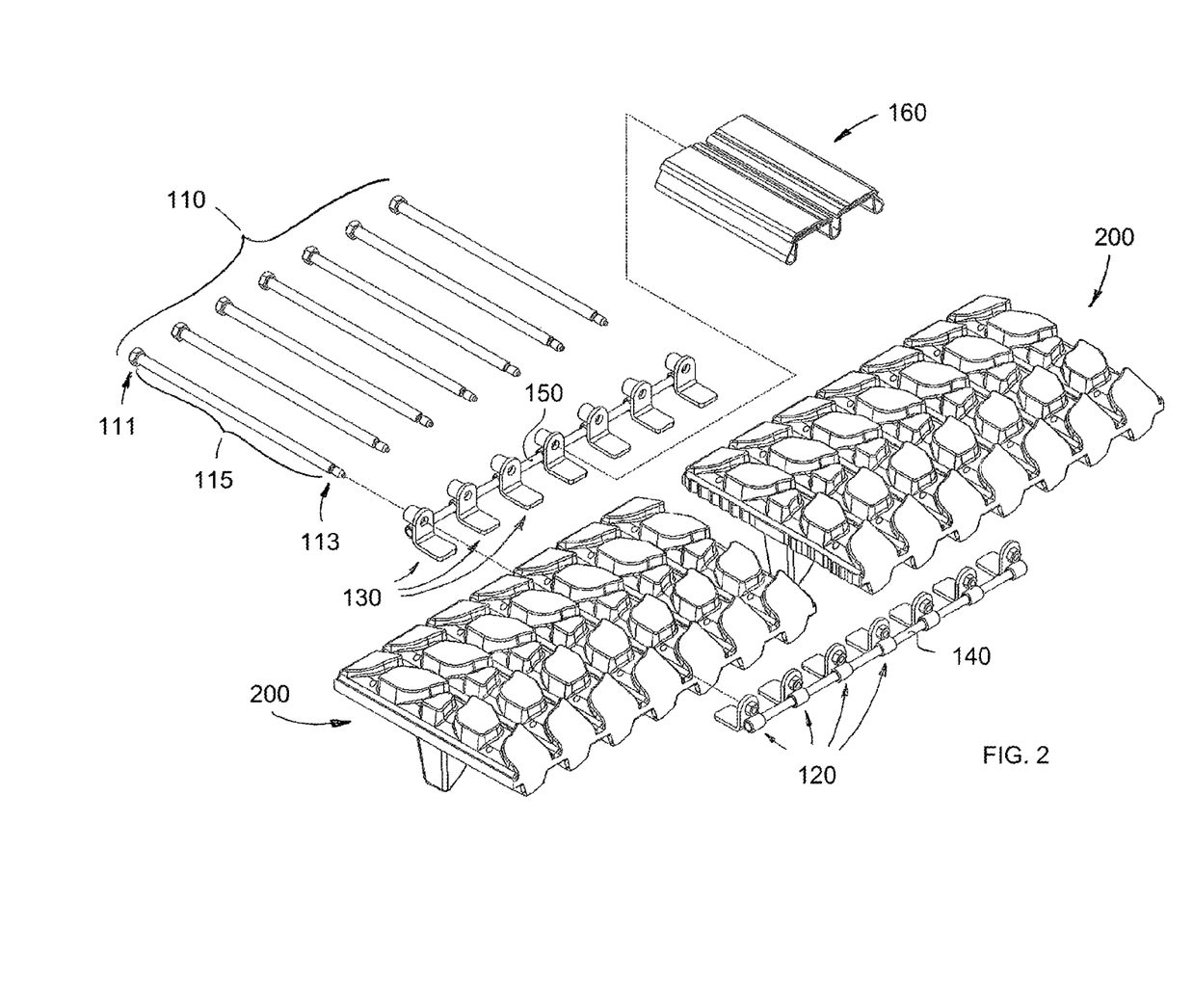
FIG. 2 is an exploded perspective view of the field-repair assembly of FIG. 1 and a damaged portion of an elastomeric track.

Referring now to FIGS. 1 and 2, a preferred embodiment of the assembly 100 of the present invention is shown. The assembly 100 generally comprises a plurality of longitudinally spaced-apart transverse members 110 which are generally adapted to be disposed into the consecutive lug-less hinge areas 213 of the outer surface 202 of the track 200. According to the preferred embodiment, the members 110 are preferably of cylindrical configuration though other shapes are possible.

Figure 4:
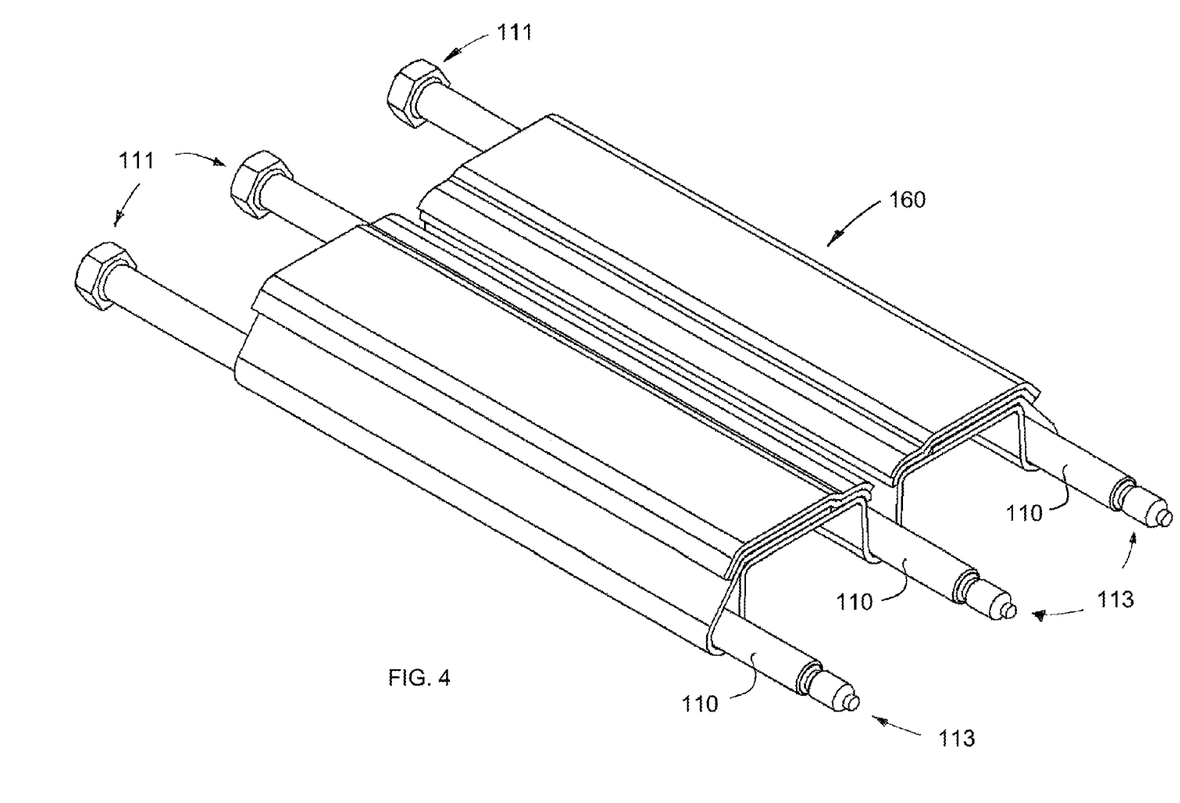
FIG. 4 is a perspective view of the bridging element and a subset of the transverse members of the field-repair assembly of FIG. 1.

As shown in FIG. 2 and particularly in FIG. 4, each member 110 comprises, in addition to an elongated cylindrical body 115, a head 111 and a threaded portion 113. Preferably, the head 111 is configured to be engageable by an external tool such as a wrench. In the preferred embodiment, the head 111 is of hexagonal configuration.

To secure the members 110 to the track 200, each member 110 is provided with a pair of mounting or retention brackets 120 and 130. As shown in FIGS. 1 and 2, brackets 120 and 130 are similar in nature. However, they generally differ enough not to be interchangeable.

The bracket 120 generally has a L-shape which defines a first portion 121 and a second portion 123. The first portion 121, which is generally flat and horizontal, is adapted to be in close contact with the inner surface 204 of the track 200 when the assembly 100 is mounted thereon whereas the second portion 123 is generally adapted to be in close contact with the side of the track 200. The second portion 123 is also generally provided with an aperture for allowing the passage of the threaded portion 113 of the member 110. Preferably fixedly mounted to the portion 123 and coaxially with the aperture is an internally threaded nut 127 or similar element. Understandably, the nut 127 is threaded with a pattern corresponding to the thread pattern of the threaded portion 113 of the member 110. Therefore, the member 110 can be securely mounted to the bracket 120 via the nut 127.

The skilled addressee will readily understand that the nut 127 is preferably a lock nut in order to prevent loosening of the members 110 during use. Alternatively, locking fluid could be advantageously applied to the nuts 127 and threaded portions 113 to also prevent loosening of the members 110.

Figure 7:
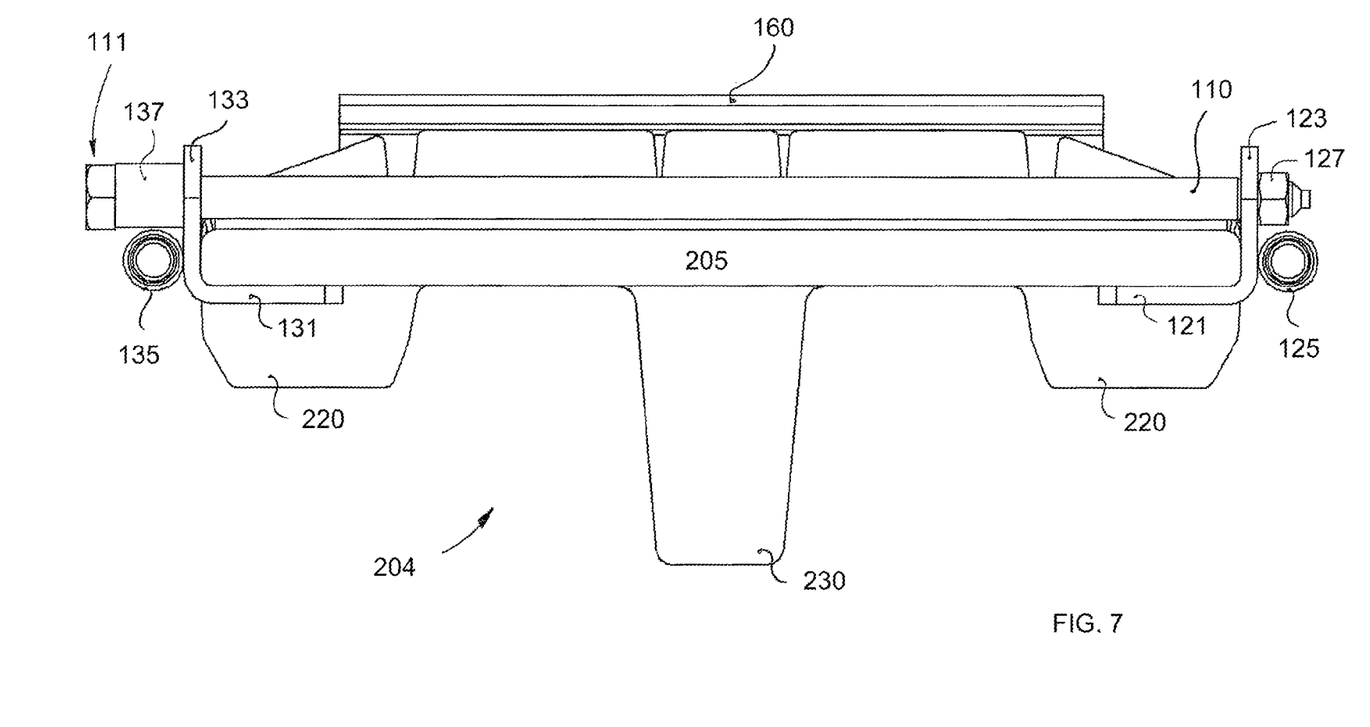
FIG. 7 is a longitudinal view of a portion of an elastomeric track with the field-repair assembly of FIG. 1 mounted thereon.
Figure 8:
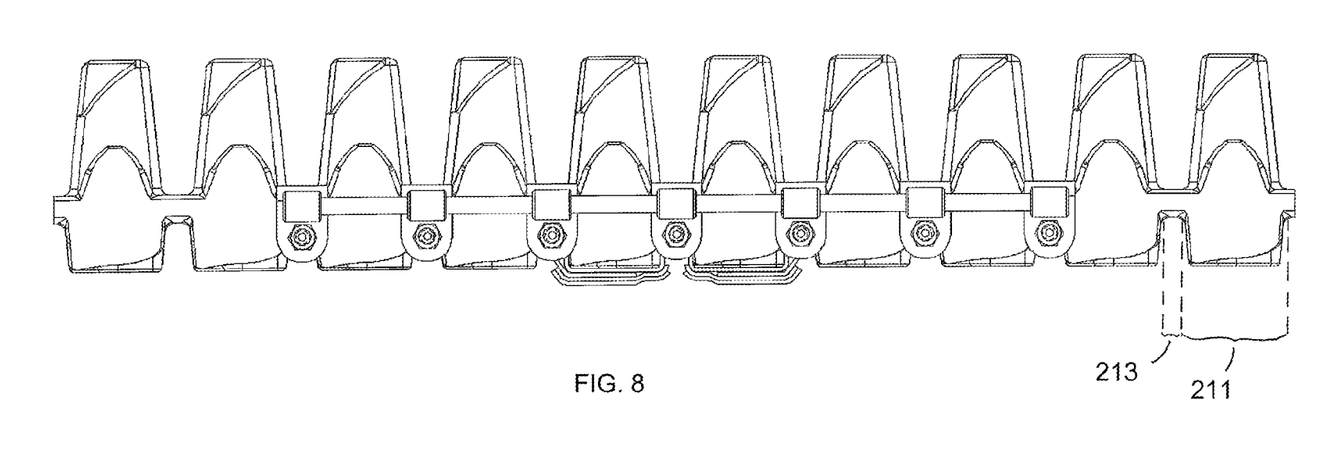
FIG. 8 is a side view of a portion of an elastomeric track with the field-repair assembly of FIG. 1 mounted thereon.
Figure 9:
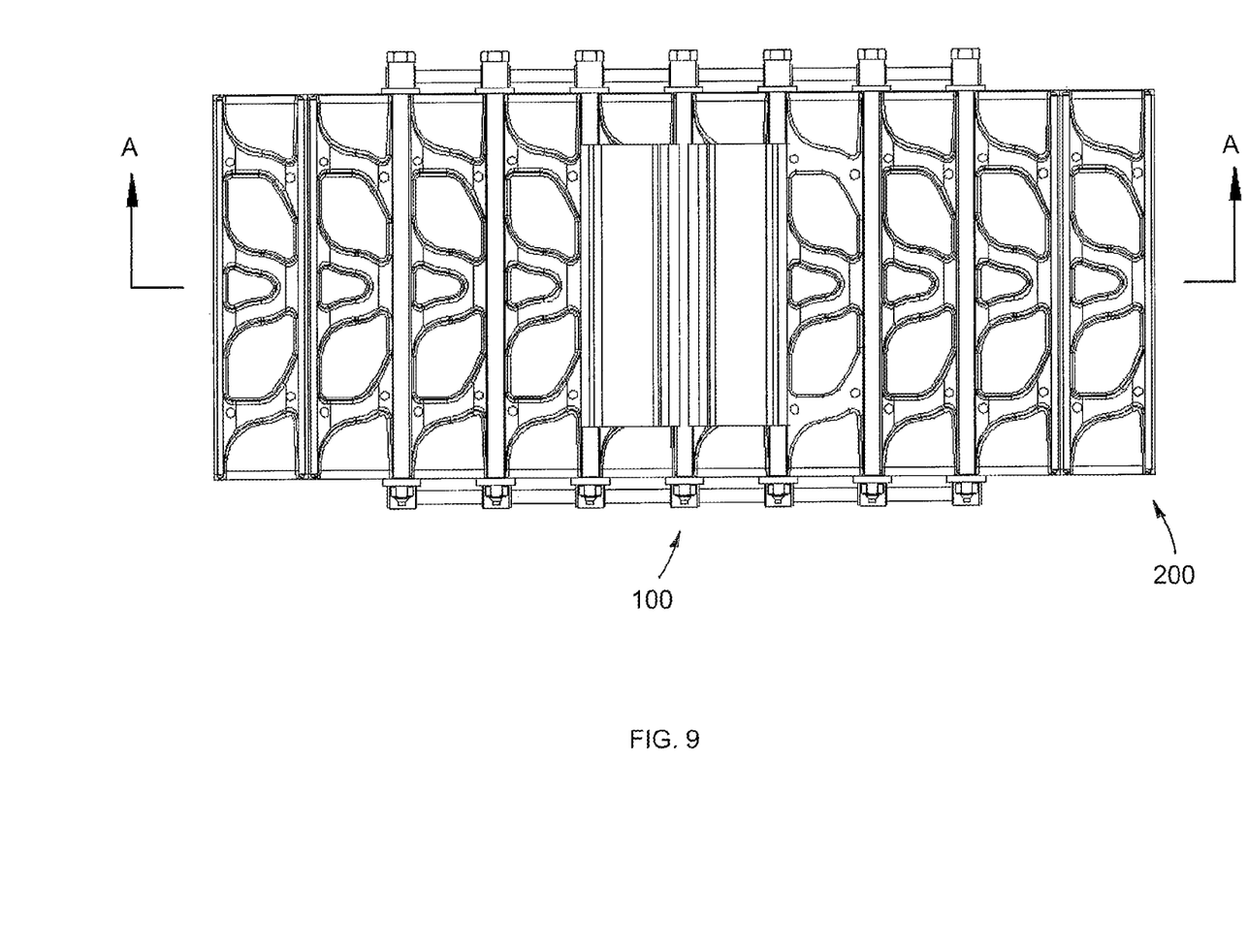
FIG. 9 is a plan view of the outer surface of a portion of an elastomeric track with the field-repair assembly of FIG. 1 mounted thereon.

The bracket 130 is also L-shaped and therefore has a first portion 131 and a second portion 133. As for bracket 120, the first portion 131 of the bracket 130 is generally flat and horizontally extending and adapted to be in close contact with the inner surface 204 of the track 200 when the assembly is mounted thereon as shown in FIG. 7. As for second portion 131, the second portion 133 is generally adapted to be in close contact with the side of the track 200 when the assembly 100 is mounted thereon. The second portion 133 is also provided with an aperture defining a passage for the cylindrical body of the member 110. The second portion 133 is also provided with a seating element 137 onto which the head 111 of the member 110 can abut when the assembly 100 is fully assembled.

As shown in FIG. 7, when the member 110 is effectively mounted to both brackets 120 and 130, the member 110 is secured to the outer surface 202 of the track 200 by the first portions 121 and 131 of the brackets which are preferably firmly in contact in the inner surface 204 of the track 200. In other words, when the member 110 and the retention brackets 120 and 130 are mounted together to the track 200, the body 205 of the track is firmly partially circumscribed by the member 110 on the outer surface 202, by the second portions 123 and 133 on the sides of the track 200 and by the first portions 121 and 131 on the inner surface 204.

As best shown in FIG. 6, the first portions 121 and 131 of the retention brackets 120 and 130 are preferably disposed between consecutive drive lugs 220 of the inner surface of the track 200. By being so located, the brackets 120 and 130 and more particularly their respective first portions 121 and 131 have only minimal effect on the driving system of the track 200. In other words, the first portions 121 and 131 interfere only slightly with the sprocket wheel (not shown) of the vehicle.

In order to provide support for the damaged area of the track 200 when mounted thereto, the assembly 100 comprises a pair of flexible cables 140 and 150. Cable 140 is fixedly mounted to each of the brackets 120 of the assembly 100 via lock rings 125 fixedly connected to each of the second portion 123. In a preferred embodiment, the lock rings 125 are welded to the brackets 120. In a similar arrangement, cable 150 is fixedly mounted to each of the brackets 130 via lock rings 135 fixedly connected to their respective second portion 133. In a preferred embodiment, the lock rings 135 are also welded to the brackets 130.

In order to insure a firm engagement between the lock rings 125 and 135 and the cables 140 and 150, cables 140 and 150 are preferably crimped by the lock rings 125 and 135 respectively.

Understandably, the cables 140 and 150 should be flexible enough to be able to bend around the sprocket wheel and idler wheel (not shown) when the track 200 travel around them. The cables 140 and 150 must also be strong enough to sustain the strains, particularly the longitudinal ones, to which the track 200 is likely to be subjected during use. Accordingly, steel and/or metallic cables are preferred.

Returning to FIGS. 1 and 2, the assembly 100 also preferably comprises a bridging element 160 which can be mounted to at least a subset of the members 110 and preferably, to three of them. The bridging element 160 preferably serves to provide continuity and support to the damaged track 200 and to prevent the damaged area to further split or crack open when engaged either by the sprocket wheel or the idler wheel of the vehicle. Consequently, the bridging element 160 will generally and preferably be mounted to the members 110 of the assembly 100 which are located over the damaged area of the track 200.

Even though it is not its primary use, the bridging element 160 could also provide traction should the damaged area of the track 200 be missing traction lugs 210.

Though a single element 160 is shown in the figures, it is to be understood that the assembly 100 could be provided with more than one bridging element 160 if necessary and if the number of members 110 is sufficient.

Figure 3:
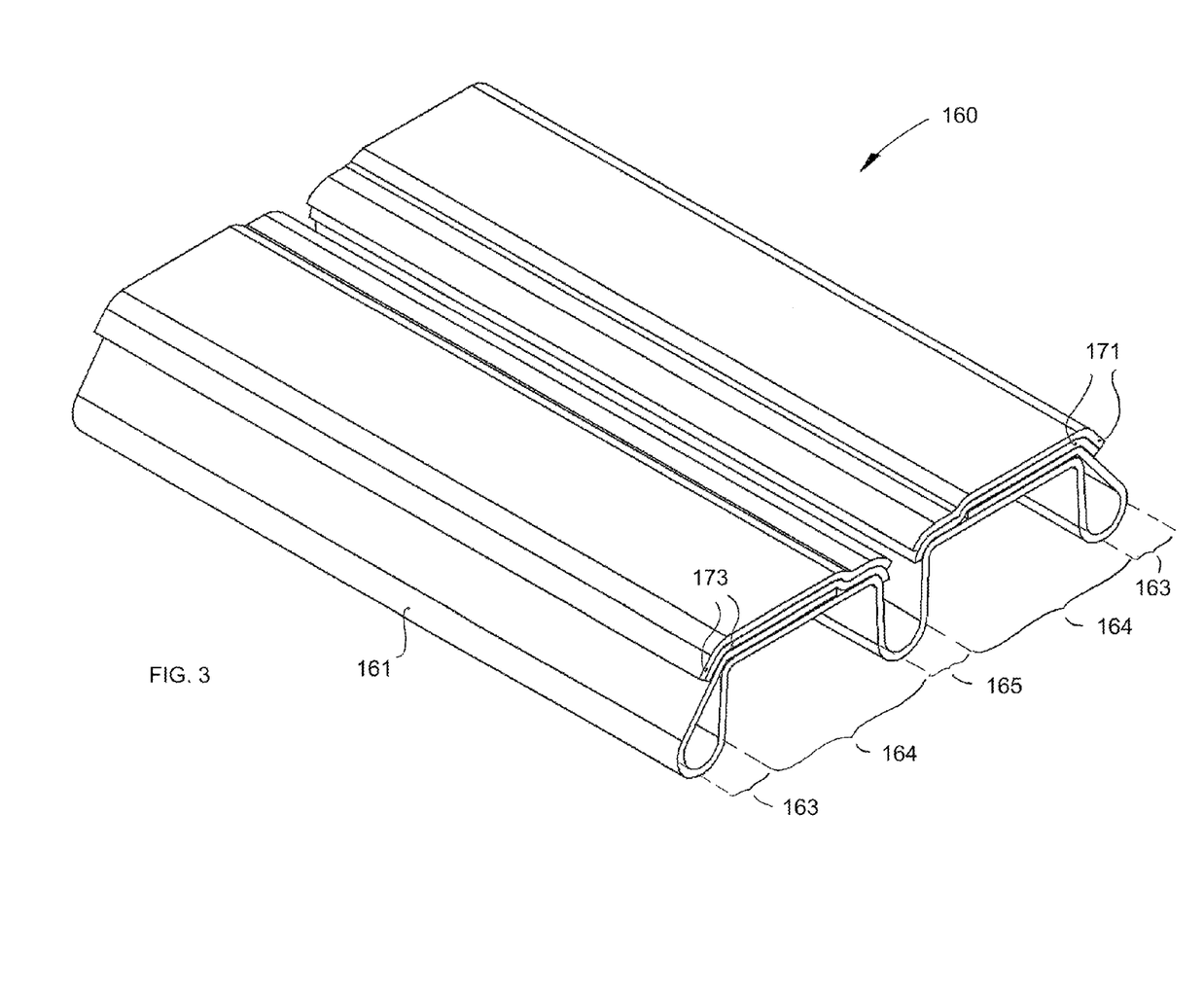
FIG. 3 is a perspective view of the bridging element of the field-repair assembly of FIG. 1.

A preferred embodiment of the bridging element 160 according to the present invention is shown in FIGS. 3 and 4. The bridging element 160 generally comprises at least one base structure 161 and preferably additional layers 171 and 173.

The base structure 161, which is preferably made of reinforced elastomeric material, is formed to define preferably two laterally extending apertures 163 through which can extend the members 110 (see FIGS. 1 and 4). The base structure 161 also defines a laterally extending channel 165 through which can extend another member 110 (see FIGS. 1 and 4). The apertures 163 and the channel 165 are preferably longitudinally spaced-apart in order to define two passageways 164 therebetween. The passageways 164 are adapted to receive the traction lugs 210 when the bridging element 160 is mounted to the outer surface 202 of the track 200.

Figure 10:
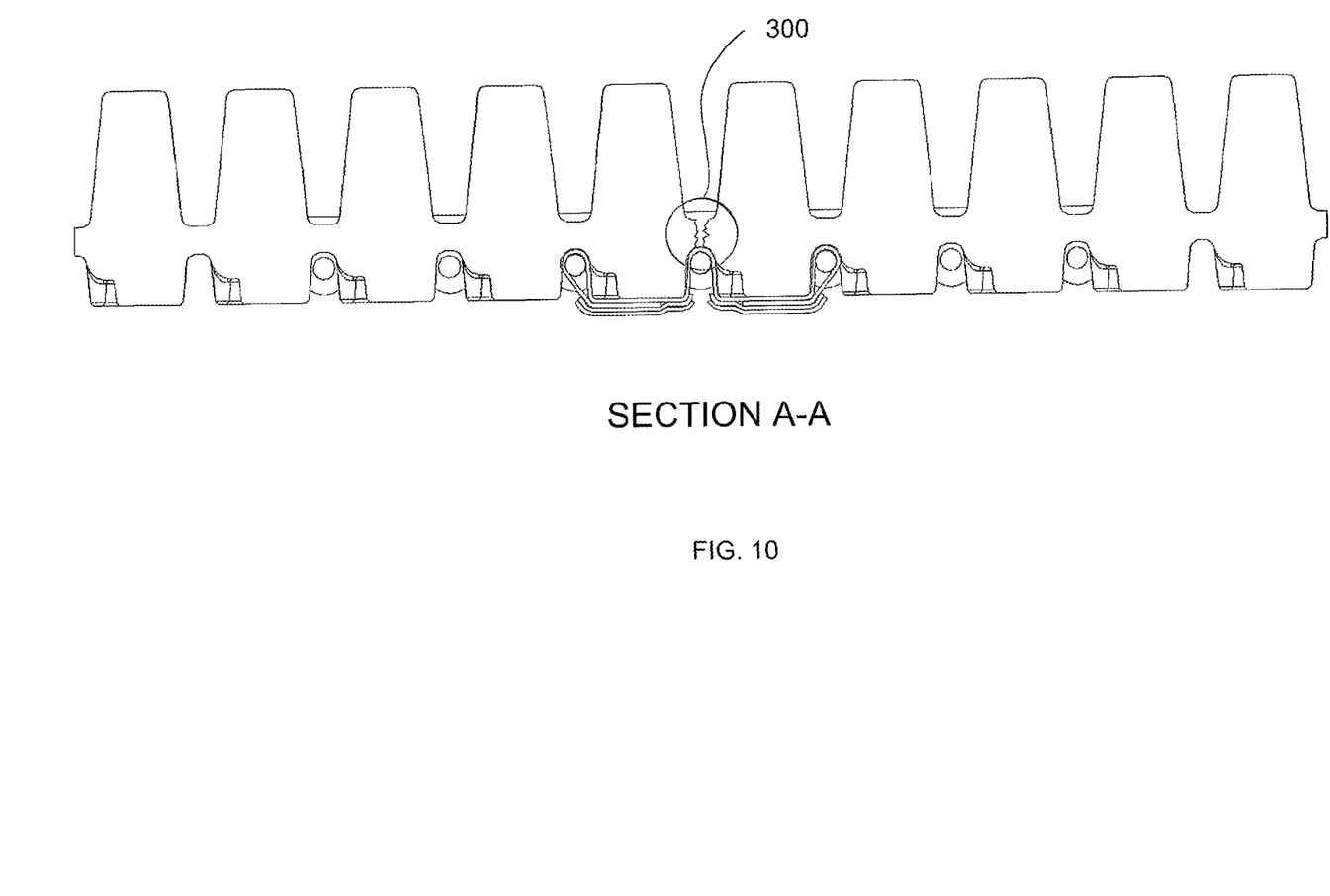
FIG. 10 is a cross-sectional side view of the elastomeric track and the field-repair assembly of FIG. 9 along lines A-A.

As best shown in FIG. 10, when the bridging element 160 is mounted to the outer surface 202 of the track 200, the apertures 163 and the channel 165 are preferably received into the lug-less hinge areas 213 of the outer surface 202 whereas the traction lugs 210 are received into the passageways 164. Understandably, the configuration of the inner side of the base structure 161 (i.e. the apertures 163, the channel 165 and the passageways 164) is preferably complementary with the configuration of the outer surface 202 of the track 200 (i.e. the traction lug areas 211 and the lug-less areas 213).

As the skilled addressee would understand, the configuration of the bridging element 160, and more particularly of the base structure 161, is customized to a particular configuration of the outer surface 202 of the track 200. Thus, different tracks would generally require different bridging elements.

As mentioned above, the bridging element 160 can also be provided with additional layers 171 and 173. The additional layers 171 and 173 are generally used to add further durability, protection and rigidity to the base structure 161 and also, when necessary, to provide additional support and traction.

In a preferred embodiment, there are two superposed layers 171 disposed on the outer side of a first passageway 164 and there are similarly two superposed layers 173 disposed on the outer side of a second passageway 164.

Since they are generally made from the same material from which the base structure 161 is made of, the layers 171 and 173 are generally fixedly mounted to the base structure 161 during the fabrication process of the bridging element 160.

Though not shown, it is conceivable that the layers 171 and 173 can be provided with or formed to have outwardly projecting lugs or grousers in order to increase the traction of the vehicle.

Since the damaged track 200 will still have to bend around the sprocket wheel and idler wheel (not shown), it is preferable that the layers 171 and 173 do not extend over the channel 165 of the base structure 161 and further be not connected together. Understandably, it is preferable to keep the bridging element 160 pliable enough to follow the curvature of the sprocket or idler wheel when the damaged area is engaged thereby.

Moreover, it is generally preferable to limit the length of the bridging element 160 in order to keep the track 200, and more particularly the damaged area over which the assembly 100 is mounted, flexible enough not to overly hinder the functioning of the vehicle.

In an alternative embodiment of the present invention, the bridging element 160, i.e. the base structure 161 and the layers 171 and 173, could be made of metal. Still, in the alternative embodiment, the base structure 161 would have to be pliable enough to be able to follow the curvature of the sprocket and idler wheels when the damaged area is engaged thereby.

In use, the field-repair assembly 100 of the present invention is preferably provided in the form of a kit comprising a series of retention brackets 120 fixedly mounted to a cable 140, a series of retention brackets 130 fixedly mounted to a cable 150, a series of members 110 and at least one bridging element 160.

Thus, when a track 200 is damaged (area 300), as shown in FIGS. 6 and 10, the assembly 100 can be mounted to the track 200 around the damaged area 300 in order to allow the vehicle to proceed to a maintenance site located nearby for a more exhaustive repair.

To assemble the field-repair assembly 100, the bridging element 160 is first disposed on the outer surface 202 of the track 200 and, most preferably, over the damaged area 300. Preferably, the bridging element 160 is disposed centrally over the damaged area 300 whereby the channel 165 is preferably aligned with the damaged area 300. Understandably, the position of the bridging element 160 can vary according to the configuration and gravity of the damage.

Once the bridging element 160 is adequately disposed on the outer surface 202, the retention brackets 120 and 130 and their respective cables 140 and 150 are disposed on each side of the track 200. Understandably, the brackets 120 and 130 are most preferably laterally aligned. Moreover, it is generally preferable to have the cables, and their respective brackets, to extend substantially equally on either sides of the damage area 300. This generally equally distributes the stress applied to the track 200.

Finally, when the bridging element 160 and the brackets and cable 120 and 140 and 130 and 150 are adequately disposed, a member 110 is inserted through each bracket 130 and threaded to each of the bracket 120. Understandably, some members 110 will extend through the apertures 163 and the channel 165 of the base structure 161 of the bridging element 160. After verifying that each member 110 is secured to its respective brackets 120 and 130 and that the assembly is solidly mounted to the track 200, the vehicle can travel anew and proceed to a maintenance site located nearby.

While illustrative and presently preferred embodiment of the invention have been described in detail hereinabove, it is to be understood that the inventive concepts may be otherwise variously embodied and employed and that the appended claims are intended to be construed to include such variations except insofar as limited by the prior art.

The invention claimed is:

1. A field-repair assembly for repairing a damaged elastomeric track having a body defining an outer ground engaging surface, an inner wheel engaging surface and opposite first and second sides, said assembly comprising:
    a. a plurality of spaced-apart elongated members having a first end and a second end, said members being adapted to be transversally disposed on said outer surface of said track;
    b. a plurality of first brackets adapted to be mounted to said first side of said track, each of said first brackets being adapted to receive a respective one of said members and to secure said respective one of said members to said outer surface of said track, said first brackets having secured thereto first locking rings;
    c. a plurality of second brackets adapted to be mounted to said second side of said track, each of said second brackets being adapted to receive a respective one of said members and to secure said respective one of said members to said outer surface of said track, each of said second brackets having secured thereto second locking rings;
    d. a first flexible cable adapted to be fixedly received into said first locking rings of said first brackets;
    e. a second flexible cable adapted to be fixedly received into said second locking rings of said second brackets.

2. An assembly as claimed in claim 1, wherein said assembly further comprises a bridging element which is adapted to be mounted to a subset of said members.

3. An assembly as claimed in claim 2, wherein said bridging element is made of sheet material.

4. An assembly as claimed in claim 2, wherein said bridging element is made of elastomeric material.

5. An assembly as claimed in claim 2, wherein said bridging element comprises a first laterally extending aperture adapted to receive a first one of said members and a second laterally extending aperture adapted to received a second one of said members.

6. An assembly as claimed in claim 5, wherein said bridging element further comprises a laterally extending channel adapted to receive a third one of said members.

7. An assembly as claimed in claim 6, wherein said first aperture, said second aperture and said channel are spaced-apart and define passageways therebetween.

8. An assembly as claimed in claim 2, wherein the configuration of said bridging element is complementary to the configuration of said outer surface of said track.

9. An assembly as claimed in claim 1, wherein said first and second flexible cables are metallic cables.

10. An assembly as claimed in claim 1, wherein said first and second flexible cables are steel cables.

11. An assembly as claimed in claim 1, wherein said first and second brackets are L-shaped and wherein each of said first and second brackets comprises a first portion adapted to engage said inner surface of said track and a second portion adapted to engage respective said first and second sides of said track.

12. An assembly as claimed in claim 11, wherein said first end of said member defines a head portion and said second end of said members defines a threaded portion.

13. An assembly as claimed in claim 12, wherein said second portion of said first brackets comprise an aperture and a threaded element substantially coaxially mounted thereto and wherein said second portion of said second brackets comprise an aperture and a seating element substantially coaxially mounted thereto whereby said threaded portion of said members can be threadedly engaged in said threaded element of said first brackets and said head portion of said members can abut on said seating element of said second brackets.

* * * * *